UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

MONOAZO DYESTUFFS.

1,114,771. Specification of Letters Patent. Patented Oct. 27, 1914.

No Drawing. Application filed April 16, 1913. Serial No. 761,476.

*To all whom it may concern:*

Be it known that we, HEINRICH JORDAN and WILHELM NEELMEIER, doctors of philosophy, chemists, citizens of the German Empire, residing at Leverkusen, near Cologne-on-the-Rhine, Germany, have invented new and useful Improvements in Monoazo Dyestuffs, of which the following is a specification.

We have found that new and valuable monoazo dyestuffs can be obtained by combining the diazo compounds prepared from para-aminosalicylic acid compounds (4-amino-1-oxy-2-carboxylic acid), such as para-aminosalicylic acid (4-amino-1-oxy-2-carboxylic acid), para-amino-sulfo-salicylic acid, para-amino-meta- or ortho-cresotinic acid, chloro- and nitro-para-amino-salicylic acids with acidylaminonaphthol compounds e. g. acidylaminonaphthols and their sulfonic acids. The new dyes are after being dried and pulverized in the shape of their alkaline salts dark powders soluble in water generally with a red to bluish-red coloration and in concentrated sulfuric acid with a red to violet coloration and yielding upon reduction with acetic acid and zinc powder a para-aminosalicylic acid compound and an amino-acidylamino-naphthol compound.

From Bordeaux to violet to blue chrome lakes fast to chlorin and soap can be produced on the fiber with the new coloring matters.

In order to illustrate the new process more fully the following example is given, the parts being by weight:—16.7 parts of 4-amino-6-methly-1-oxy-2-carboxylic acid are diazotized with 20 parts of hydrochloric acid (19½° Bé.) and 6.9 parts of sodium nitrite. The suspension of the diazo compound thus obtained is then stirred into a cold solution of 40.5 parts of the disodium salt of the acetyl-1-amino-8-naphthol-3.6-disulfonic acid and 16 parts of soda in 1000 parts of water. After about 12 hours' stirring the combination is complete and nearly all of the dyestuff has separated. It is after being dried and pulverized in the shape of its sodium salt a dark powder soluble in water with a red-violet coloration and in concentrated sulfuric acid with a red-blue coloration; and yielding upon reduction with zinc powder and acetic acid 4-amino-6-methyl-1-oxy-2-carboxylic acid and 1-acetylamino-7-amino-8-oxy-naphthalin-3.6-disulfonic acid. It has in a free state most probably the formula:

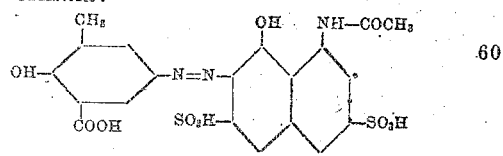

When printed with acetate of chromium on the fiber a pure violet shade is obtained fast to chlorin and soap.

Other acidyl products can be used, such as the benzoyl-derivatives of aminonaphthol compounds, etc., or acidyl derivatives of other aminonaphthol compounds, such as of the 1.5.7-, 1.8.4.6-, 1.8.3.5-, 1.8.2.4-, 1.8.5-, 1.4.7- aminonaphthol sulfonic acid, 1-acetyl-amino-7-naphthol, etc.

We claim:—

1. The herein described new monoazo dyestuffs having as components the radicals of para-aminosalicylic acid compounds (4-amino-1-oxy-2-carboxylic acid) and acidylaminonaphthol compounds, which are after being dried and pulverized in the shape of their alkaline salts dark powders soluble in water generally with a red to bluish-red coloration and in concentrated sulfuric acid with a red to violet coloration; yielding upon reduction with acetic acid and zinc powder a para-aminosalicylic acid compound and an acidyldi-aminonaphthol compound; and furnishing on the fiber from Bordeaux to violet to blue chrome lakes fast to chlorin and to soap, substantially as described.

2. The herein-described new monoazo dyestuffs having as components the radicals of substituted para-aminosalicylic acid compounds (4-amino-1-oxy-2-carboxylic acid) and acidylaminonaphthol compounds, which are after being dried and pulverized in the shape of their alkaline salts dark powders soluble in water generally with a red to bluish-red coloration and in concentrated sulfuric acid with a red to violet coloration; yielding upon reduction with acetic acid and zinc powder a substituted para-aminosalicylic acid compound and an acidyl-diaminonaphthol compound; and furnishing on the fiber from Bordeaux to violet to blue chrome lakes fast to chlorin and to soap, substantially as described.

3. The herein-described new monoazo dyestuffs having as components the radicals of para-aminosalicylic acid compounds (4-amino-1-oxy-1-carboxylic acid) and acidyl-aminonaphthol sulfonic acids, which are after being dried and pulverized in the shape of their alkaline salts dark powders soluble in water generally with a red to bluish-red coloration and in concentrated sulfuric acid with a red to violet coloration; yielding upon reduction with acetic acid and zinc powder a para-aminosalicylic acid compound and an acidyldiaminonophthol sulfonic acid; and furnishing on the fiber from Bordeaux to violet to blue chrome lakes fast to chlorin and to soap, substantially as described.

4. The herein described new monoazo dyestuffs having as components the radicals of para-aminosalicylic acid compounds (4-amino-1-oxy-2-carboxylic acid) and acidyl-aminonaphthol disulfonic acids, which are after being dried and pulverized in the shape of their alkaline salts dark powders soluble in water generally with a red to bluish red coloration and in concentrated sulfuric acid with a red to violet coloration; yielding upon reduction with acetic acid and zinc powder a para-aminosalicylic acid compound and an acidyl-diaminonaphthol disulfonic acid; and furnishing on the fiber from Bordeaux to violet to blue chrome lakes fast to chlorin and to soap, substantially as described.

5. The herein described new monoazo dyestuff having in a free state most probably the formula:

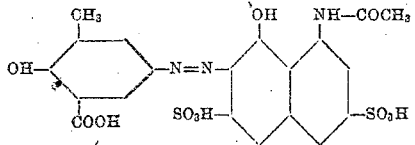

which is after being dried and pulverized in the shape of its sodium salt a dark powder soluble in water with a red-violet coloration and in concentrated sulfuric acid with a red-blue coloration; yielding upon reduction with zinc powder and acetic acid para-amino-ortho-cresotinic acid and 1-acetylamino-7-amino-8-oxynaphthalin-3.6-disulfonic acid; furnishing when printed on the fiber with acetate of chromium violet shades fast to chlorin and to soap, substantially as described.

In testimony whereof we have hereunto set our hands in the presence of two subscribing witnesses.

HEINRICH JORDAN. [L. S.]
WILHELM NEELMEIER. [L. S.]

Witnesses:
DORA NUFER,
HELEN NUFER.